(12) United States Patent
Carlberg et al.

(10) Patent No.: US 11,103,935 B2
(45) Date of Patent: Aug. 31, 2021

(54) DRILL INSERT

(71) Applicant: SANDVIK INTELLECTUAL PROPERTY AB, Sandviken (SE)

(72) Inventors: Hakan Carlberg, Sandviken (SE); Fritz Alum Yah, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/644,644

(22) PCT Filed: Aug. 24, 2018

(86) PCT No.: PCT/EP2018/072894
§ 371 (c)(1),
(2) Date: Mar. 5, 2020

(87) PCT Pub. No.: WO2019/048265
PCT Pub. Date: Mar. 14, 2019

(65) Prior Publication Data
US 2021/0060664 A1    Mar. 4, 2021

(30) Foreign Application Priority Data
Sep. 6, 2017   (EP) .................................... 17189610

(51) Int. Cl.
*B23B 51/02*   (2006.01)
*B23B 51/04*   (2006.01)

(52) U.S. Cl.
CPC ...... *B23B 51/048* (2013.01); *B23B 2200/242* (2013.01); *B23B 2251/122* (2013.01); *B23B 2251/48* (2013.01); *B23B 2251/50* (2013.01); *Y10T 407/245* (2015.01); *Y10T 408/9097* (2015.01)

(58) Field of Classification Search
CPC .............. B23B 51/048; B23B 2251/48; Y10T 407/245

See application file for complete search history.

(56) References Cited

U.S. PATENT DOCUMENTS

| | | | | |
|---|---|---|---|---|
| 4,312,250 A | * | 1/1982 | Yankoff | B23B 27/143 407/114 |
| 4,776,732 A | * | 10/1988 | Hale | B23B 51/048 407/114 |
| 4,934,879 A | | 6/1990 | Van Barneveld | |
| 5,630,681 A | * | 5/1997 | Paya | B23B 27/141 407/114 |
| 6,039,515 A | | 3/2000 | Lamberg | |
| 6,715,967 B2 | * | 4/2004 | Wiman | B23B 27/141 407/113 |
| 8,157,489 B2 | * | 4/2012 | Wolf | B23B 27/141 408/223 |

(Continued)

FOREIGN PATENT DOCUMENTS

| CN | 1080885 A | 1/1994 |
|---|---|---|
| CN | 203711879 U | 7/2014 |

(Continued)

*Primary Examiner* — Eric A. Gates
(74) *Attorney, Agent, or Firm* — Corinne R. Gorski

(57) ABSTRACT

A metal cutting drill insert for a drill tool having a chip disruptor provided at a rake face. The chip disruptor is further configured with a chamfer at a leading cutting edge region to increase cutting resistance and facilitate chip breakage.

20 Claims, 7 Drawing Sheets

(56) References Cited

U.S. PATENT DOCUMENTS

| | | | | |
|---|---|---|---|---|
| 10,427,224 B2* | 10/2019 | Straka | ............... | B23B 51/048 |
| 2015/0093207 A1* | 4/2015 | Lawes | ............... | B23B 27/145 |
| | | | | 408/229 |
| 2016/0193668 A1* | 7/2016 | Matsunaga | ........... | B23B 51/048 |
| | | | | 408/231 |

FOREIGN PATENT DOCUMENTS

| | | |
|---|---|---|
| CN | 105290546 A | 2/2016 |
| CN | 206296476 U | 7/2017 |
| EP | 2853328 A1 | 4/2015 |
| EP | 2979793 A1 | 2/2016 |
| EP | 1902799 B1 | 9/2018 |
| JP | 62-181805 A | 8/1987 |
| JP | 11-77409 A | 3/1999 |

\* cited by examiner

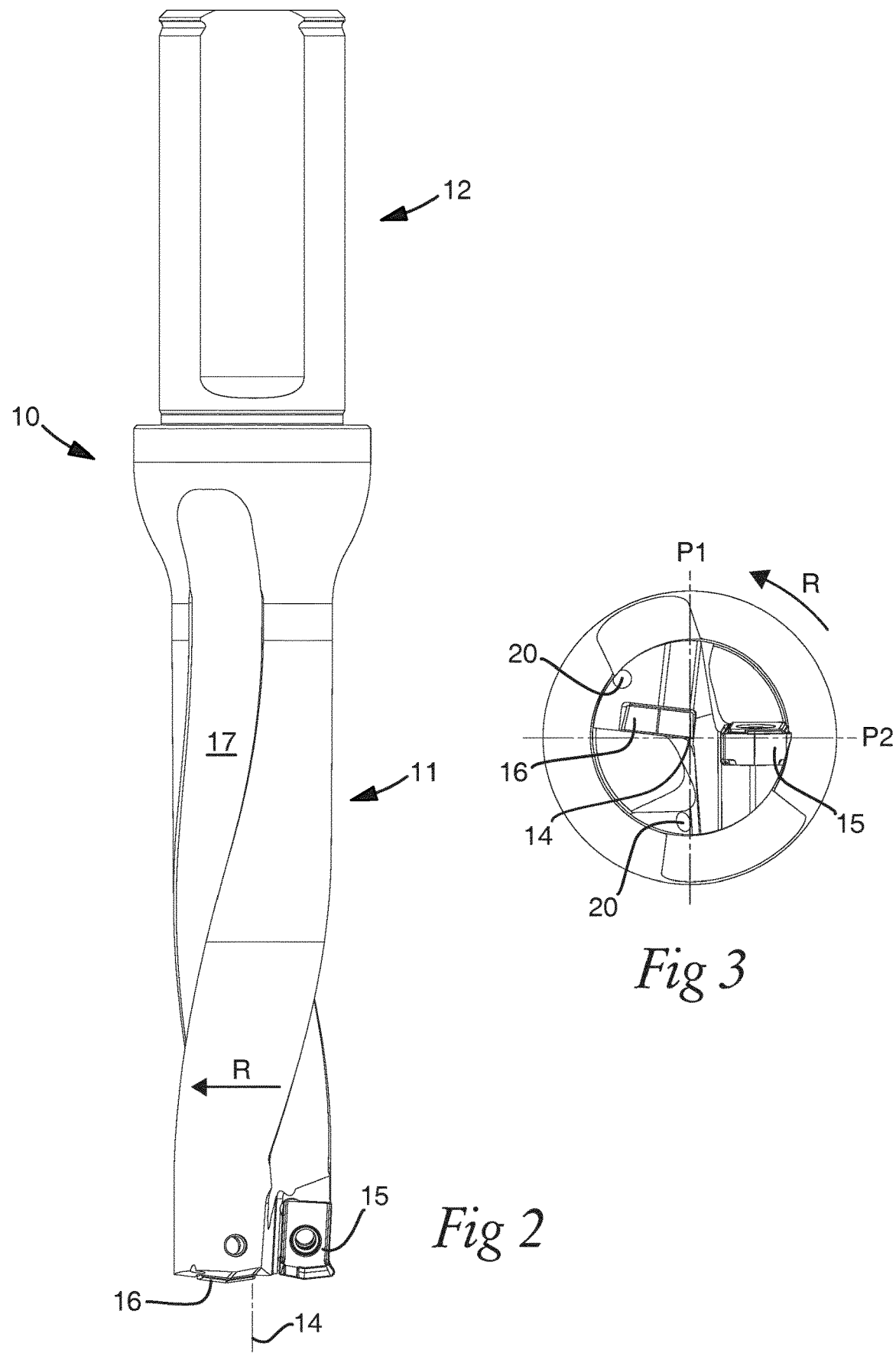

DRILL INSERT

RELATED APPLICATION DATA

This application is a § 371 National Stage Application of PCT International Application No. PCT/EP2018/072894 filed Aug. 24, 2018 claiming priority to EP17189610.3 filed Sep. 6, 2017.

FIELD OF INVENTION

The present invention relates to a metal cutting drill insert for a drill tool having a chip disruptor provided at a rake face of the insert configured to facilitate chip breaking during drilling and create small chip fragments.

BACKGROUND ART

Rotatable drill tools find specific application for workpiece processing in addition to general cutting and milling tools. Conventionally, an indexable insert drill tool includes at least two separate inserts in which a central insert is mounted at an axial centre of the tool and a peripheral insert represents a radially outermost portion of the cutting region. Accordingly, during rotation of the tool the central insert, being axially forward relative to the peripheral insert, creates a ring-shaped groove in the workpiece. On continued rotation and axial advancement of the tool, the peripheral cutting insert, positioned to overlap the central insert, cuts into the workpiece to radially extend the initial groove via radially overlapping sweep areas of the central and peripheral inserts. Accordingly, the drill hole is formed by a cooperative cutting action. Typically, the workpiece chip created by the inserts, is guided rearwardly by chip flutes that extend axially from the tool forward cutting region. An example dual insert drill tool is described in EP 1902799.

However, a problem with existing drill tools having one or more cutting inserts is a tendency for workpiece chip formation to reduce drilling efficiency as a result of insufficient chip evacuation from the drill hole. Most common is for the chips to form tangle balls or spiraled columns that build up at the cutting machine (typically a CNC or multi-operation unit) and hinder uninterrupted and continued cutting.

Additionally, the high demand application of drill inserts create high working temperatures and stress at the inserts which in turn accelerate insert wear and fatigue particularly at the region of the cutting edges. This significantly shortens insert operational lifetimes. Accordingly, what is required is an insert and drill tool mounting an insert that addresses the above problems.

SUMMARY OF THE INVENTION

It is an objective of the present invention to provide an insert for a drill tool configured to create short chip fragment lengths and to specifically avoid the creation of chips formed as tightly curled balls or long helical strips. Accordingly, it is the general objective to provide a drill insert for cutting metal enabling highly efficient drilling and borehole creation.

It is a specific objective to provide an insert for a drill tool configured to facilitate workpiece chip fracture and breaking as the chip is formed at the insert cutting region. Accordingly, it is an objective to facilitate rearward axial transport of the chip fragments from the as-formed borehole to prevent blockage or clogging of the bore that would otherwise hinder continued axial advancement of the drill tool. It is a further specific objective to provide an insert to facilitate chip breakage without weakening the insert with regard to wear and fatigue encountered during cutting. It is a yet further objective to provide an insert that is not detrimental to drilling stability and particularly does not destabilise a desired smooth rotational motion of the drill tool.

The objectives are achieved by providing a cutting insert configured firstly to facilitate the creation of the chip that is more susceptible to fracture and breakage and secondly to encourage the as-formed chip to break immediately or shortly after it is created from the workpiece. This is advantageous to minimise chip size and accordingly facilitate chip evacuation from the as-formed borehole. The objectives are achieved specifically via an insert having a raised or recessed chip disruptor (alternatively referring to herein as a chip breaker) positioned at a rake face at the insert immediately behind the cutting edge. The chip disruptor is accordingly configured to provide an obstruction positioned within the path of the as-created chip to induce mechanical stress to the chip and encourage it to break. The objectives are achieved further by providing a chamfer at the leading portion of the chip disruptor, located at the region of the cutting edge of the insert. The chamfer may be considered to represent an intersection of the adjoining rake face and clearance face and is defined relative to a remainder of the cutting edge (at one or both sides of the chip disruptor) that may be considered to be non-chamfered and to have a different shape profile. That is, and preferably, the remainder of the cutting edge (defined by the intersection of the rake face and the clearance face) may be considered sharp, angled or acute relative to that portion of the cutting edge within the region of the chip disruptor that is chamfered (alternatively termed bevelled). The chamfer comprises an intersection surface (being a transition region between the rake face and the clearance face) that may be substantially planar and aligned transverse the rake face and the clearance face. Optionally, the intersection surface may be curved comprising one or a plurality of radii of curvature in a plane perpendicular to a length of the cutting edge as defined in widthwise direction across the insert between a first lateral side and a second lateral side.

The chamfer (having the intersection surface) is advantageous to increase the cutting resistance of the insert specifically at the region of the chip disruptor. Accordingly, the cutting portion of the tool comprises a greater cutting resistance at the region of the chip disruptor relative to a position at one or either side of the chip disruptor at the remainder of the cutting edge. Accordingly, the chip when formed is heated to a greater extent at the region of the chip disruptor and accordingly becomes more brittle and is therefore more susceptible to fracture and breakage. The raised or recessed chip disruptor (provided at the rake face immediately behind the leading cutting edge in the rotational direction of the tool) and positioned within the path of the growing chip, provides an obstruction that facilitates cracking and breaking of at least the brittle portion of the chip.

According to a first aspect of the present invention there is provided a metal cutting drill insert for a drill tool comprising: at least one cutting edge formed at an intersection of an adjoining rake face and a clearance face, the cutting edge having a length to be aligned radially at the tool; a chip disruptor formed as a raised projection or recess at the rake face and extending from the cutting edge; characterised by: a chamfer at the intersection of the rake face and the clearance face and positioned at the chip disruptor, the chamfer being defined relative to a profile of the cutting edge at one or either side of the chip disruptor.

The present insert having a chamfer extending only partially along the cutting edge is further advantageous to facilitate chip breakage without compromising the stability of the cutting tool which may otherwise be reduced due to the presence of high resistance cutting edge region. Accordingly, the present insert provides a stable cutting action as the chamfer extends along only a portion of a total length of the cutting edge being for example less than 70%, 60%, 50%, 40%, 30% 20% or 10% of the total length of the cutting edge as defined between a first and second lateral side of the insert, where the insert is positionable at the drill tool such that the first lateral side is located radially inward and the second lateral side is located at a radially outermost part of the tool to define a diameter of the axially forwardmost cutting region.

Preferably, the drill insert is configured to work cooperatively with a second insert, the inserts mountable at the tool at different radial positions such that during a rotation thereof, the inserts overlap radially to define an annular intersection zone; wherein the chip disruptor is positioned relative to the cutting edge within the intersection zone. In particular, the inventors have identified that by positioning the disruptor (and hence the chamfer) at the region of the intersection zone, the effectiveness of the chamfer and the chip disruptor to induce and facilitate chip breakage is maximised. That is, at the region of the radial overlap of the peripheral and central inserts, this portion of the as-formed chip has been observed to be weakest. Accordingly, a length of the chamfer and chip disruptor (in the lengthwise direction of the cutting edge) may be minimised so as to maintain to a minimum any increased instability of the tool during use due to the presence of the chamfer whilst facilitating chip breakage. Additionally, by maintaining to a minimum the length of the chamfer (sufficient to achieve chip breakage), the longevity and working lifetime of the insert is maximised.

As indicated, the cutting portion of the insert (represented by the cutting edge) comprises a different shape profile at the chip disruptor relative to a remainder of the cutting edge at one, either or both sides of the chip disruptor. That is, the remainder of the cutting edge may be formed as a relatively 'sharp' intersection of the rake face and clearance face whilst the cutting region of the chip disruptor is chamfered. Accordingly, the cutting portion of the insert at the chip disrupter is distinguished, via the shape profile created by the chamfer, form the remainder of the cutting edge. Optionally, the remainder of the cutting edge may have a chamfer, bevel or be rounded according to one or two radii. However, with any such configurations, the chamfer (formed by a generally planar surface or a curved or rounded surface), will always have shape profile that is different to the remainder of the cutting edge.

Preferably, the chamfer at the chip disruptor defines an intersection surface that is generally planar. Preferably, the intersection surface is aligned transverse to the adjoining rake face and a clearance face, the cutting edge at one or either side of the chip disruptor being devoid of an intersection surface having i) an alignment and/or ii) a width extending between the rake face and the clearance face that corresponds to that of the intersection surface at the chip disruptor.

Preferably, a length of the chip disruptor in a lengthwise direction along the rake face is less than a remaining length portion of the cutting edge at one or both sides of the chip disruptor between lateral sides of the insert. Such an arrangement minimises any increased instability of the drill tool due to the presence of the chamfer. Preferably, a length of the chip disruptor is 5 to 60%, 10 to 50%, 20 to 40%, 30 to 40% or 30 to 35% of a total length of the cutting edge, where the total length includes the chamfer and the cutting edge at one or both sides of the chip disruptor between the lateral sides of the insert.

Preferably, the insert comprises a single chip disruptor at the rake face. The chip disruptor is defined in a lengthwise direction of the rake face (corresponding to a widthwise direction across the insert) by respective first and second transition regions formed as inclined or declined surfaces. Such transition region surfaces at the rake face are inclined or declined relative to a plane aligned perpendicular to the longitudinal axis of the tool with their orientation dependent upon whether the disruptor is a raised projection (formed as a rib, step, hump or bump) or is a recess (formed as a groove, channel or cavity) at the rake face. Optionally, the chip disruptor extends the full width across the rake face (corresponding to a lengthwise direction of the insert). Such an arrangement is advantageous to maximise the strength of the chip disruptor and minimise stress concentrations during cutting. The presence of a single chip disruptor is advantageous to minimise any cutting instability of the drill tool due to the presence of the disruptor and the chamfer whilst achieving sufficient chip breakage. Optionally, the chip disruptor may extend partially across the rake face (in a direction perpendicular to the length of the cutting edge).

Preferably, the chamfer at the chip disruptor comprises an intersection surface and in a plane perpendicular to a length of the cutting edge the intersection surface is aligned in a range 20 to 70°, 25 to 65°, 30 to 60°, 35 to 55° or 40 to 50° relative to the clearance face. Such an arrangement is advantageous to provide sufficient cutting resistance at the region of the chip disruptor to accordingly increase the brittleness of the as-formed chip.

Preferably, the insert is a peripheral insert to work cooperatively with a central insert of the drill tool, the peripheral and central inserts being defined positionally relative to one another in a radial direction and relative to a longitudinal axis of the drill tool. Preferably, the central and peripheral inserts comprise a through-bore to receive a mounting screw for attachment at the drill tool. Preferably, the central and peripheral inserts may be indexable comprising a first and a second cutting edges (defined by corresponding rake and clearance faces) provided at opposite lengthwise ends of each respective insert. According to further embodiments, the peripheral insert may comprise one, two, three, four or more cutting edges at one side and/or one, two, three, four or more cutting edges at an opposite side.

Optionally, the insert (including the peripheral and central inserts) comprises an overall generally rectangular cuboidal shape in which the cutting edge extends widthwise across the insert at one, two, three, four or more edges of the insert, where the insert may be indexable. Optionally, the cutting region of the insert may be enlarged such that in a widthwise direction across the insert, the insert width is greater at the cutting region relative to a central region of the insert (corresponding to a mid-length region of the insert in a direction between end clearance faces.

Preferably, the chip disruptor is positioned at the insert in a lengthwise direction of the cutting edge closer to a first lateral side of the insert relative to a second lateral side of the insert. Such a configuration positions the chip disruptor at the region of the intersection zone (radially overlapping region of the central and peripheral inserts) so as to maximise chip breakage effectiveness. Such an arrangement is advantageous to provide a peripheral insert that is universal being suitable for mounting at different diameter drill tools with the disruptor positioned at the intersection zone as defined by the rotational paths of the central and peripheral inserts.

Preferably, the chip disruptor is positioned in a lengthwise direction of the cutting edge exclusively in a first half of the insert closer to the first lateral side. Optionally, the chip disruptor may extend from the first radially inner half to a second radially outer half of the cutting edge. Preferably, a majority of the chip disruptor is positioned within the first half of the insert intended to be mounted closest to the axial centre of the tool corresponding to the region of intersection (radial overlap) with the central insert.

Optionally, in a lengthwise direction of the cutting edge, a portion of the cutting edge is curved or angled such that a second end of the cutting edge closest to a second lateral side of the insert is raised relative to a first end of the cutting edge closest to a first lateral side of the insert. Preferably, a portion of the cutting edge closest to the second lateral side is concave to be curved upwardly towards the second end of the cutting edge when the insert is viewed end-on from the clearance face. Such an arrangement is advantageous to encourage and facilitate the creation of a tightly curled chip which accordingly occupies a reduced volume within the bore and is therefore ejected more readily during drilling. Insert and drilling tool lifetimes are thereby extended. The cutting edge is preferably curved and concave at the radially outer region of the insert when mounted at the drill tool such that the radially outer end of the cutting edge projects forward (in a rotational direction of the drill tool) relative to a central region and a radially inner region of the cutting edge. According to one preferred embodiment, the radially outer end of the cutting edge projects at a raised or forward position relative to a mid-length region of the cutting edge and a radially innermost end of the cutting edge. Accordingly, the insert may be considered 'thicker' at the radially outer end to have a 'wedge-shape' profile at the radially outer region. This raised outer region of the cutting edge cuts into the workpiece to a greater extent and before the radially inner regions of the insert to provide the lifting and curling of the chip during drilling.

According to a second aspect of the present invention there is provided a metal cutting drill tool comprising: an elongate drill body having an axially forward boring shaft and an axially rearward mount shank; and a drill insert as claimed herein mountable at an axially forward end of the shaft. The cutting insert can be mounted such that the cutting edge is aligned in a radial direction or in a direction that is generally radial, i.e. the cutting edge is aligned in a direction from a central area of the drill body towards the periphery. For example, an extension of the cutting edge can intersect the longitudinal axis of the drill body or a point close to the longitudinal axis of the drill body.

Preferably, the insert is mounted at a radially peripheral region of the drill tool to form a peripheral insert. Preferably, the tool comprises a second cutting insert mounted at or towards a radial central region of the drill tool to form a central insert relative to the peripheral insert. Preferably, the tool comprises a single peripheral and a single central insert mounted at the axially forward end of the shaft.

Preferably, the peripheral and central inserts are mounted at the drill tool such that during a rotation thereof, the inserts overlap radially to define an annular intersection zone; wherein the chip disruptor is positioned relative to the cutting edge within the intersection zone.

Preferably, in a radial direction, a majority of the chip disruptor is positioned within the intersection zone. Optionally, the chip disruptor may extend outside of the intersection zone including a minor portion or a major portion of the chip disruptor in a lengthwise direction of the cutting edge (corresponding to a widthwise direction across the insert). Accordingly, the present insert may be adapted to provide and facilitate chip breakage at a desired radial position of the as-formed chip relative to an axial centre of the drill tool.

Preferably, the shaft comprises chip flutes extending axially rearward from the axially forward end towards the mount shank. Preferably, the central and peripheral inserts are positioned at the axially forward end of each of the respective chip flutes such that the respective cutting edges of the inserts are configured to create chip fragments propelled directly to the chip flutes to facilitate rearward evacuation from the borehole.

BRIEF DESCRIPTION OF DRAWINGS

A specific implementation of the present invention will now be described, by way of example only, and with reference to the accompanying drawings in which:

FIG. 2 is further perspective view of the drill tool of FIG. 1;

FIG. 3 is an axial end view of a cutting end region of the drill tool of FIG. 2;

DETAILED DESCRIPTION OF PREFERRED EMBODIMENT OF THE INVENTION

Figure 1:
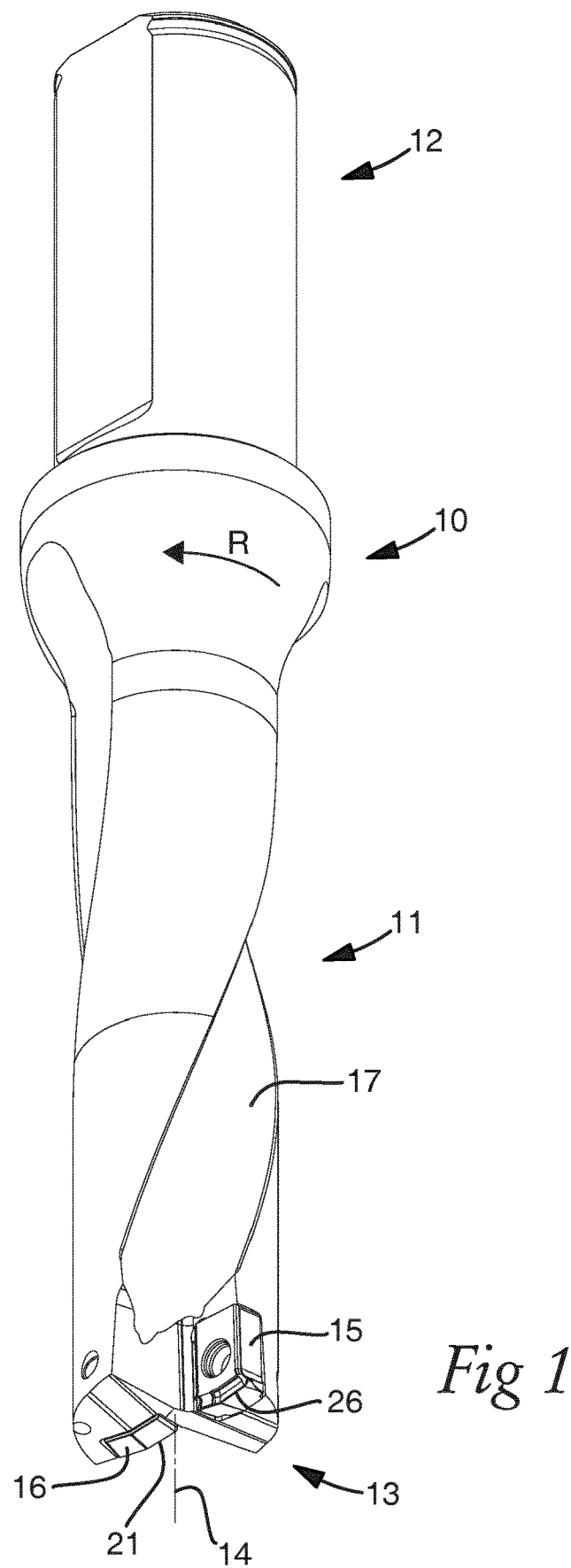
FIG. 1 is a perspective view of an elongate drill tool mounting a pair of cutting inserts including a central and a peripheral insert according to a specific implementation of the present invention.

Referring to FIGS. 1 and 2, an indexable-insert drill tool specifically adapted for cutting metal comprises a drill body 10 having an axially rearward shank to mount the drill body 10 within a drilling machine and an axially forward shaft 11 having a cutting end 13. Shaft 11 comprises a pair of radially opposed chip flutes 17 extending axially and helically around a central longitudinal axis 14 of drill body 10 from cutting end 13 towards a rearward end of shaft 11. Referring to FIG. 3, a pair of bores 20 extend axially through drill body 10 to provide delivery of a flushing fluid. A pair of abrasion resistant cutting inserts are mounted at shaft cutting end 13 that include specifically a central insert 16 and a peripheral insert 15. Each insert 15, 16 comprises a bore 30 (illustrated for the peripheral insert 16 within FIGS. 4 to 6) to receive a mounting screw (not shown) for attachment to the drill shaft 11. Central insert 16 comprises a leading cutting edge 21 and peripheral insert 15 comprises a corresponding leading cutting edge 26.

Referring to FIGS. 1 to 3, drill body 10 is configured to rotatable in a direction R about axis 14 such that the cutting edges 21, 26 via axial advancement of drill body 10, are configured to cut into a workpiece material (not shown) to create a borehole having a diameter corresponding to that of the cutting tool as determined by peripheral insert 15. Referring specifically to FIG. 3, the axial end view of the cutting tool may be divided by two perpendicular imaginary planes P1 and P2 that intersect at axis 14. Peripheral cutting insert 15 is positioned entirely at one side of plane P1 whilst a major part of central insert 16 is positioned within an opposite side of plane P1. The cutting edges 21, 26 both inserts 16, 15 are located at or near plane P2. According to the specific implementation, central insert 16 is aligned transverse to plane P2 such that a radially outer side of central insert 16 is positioned rearward of a radially inner side in the rotational direction R of the drill tool.

Figure 4:
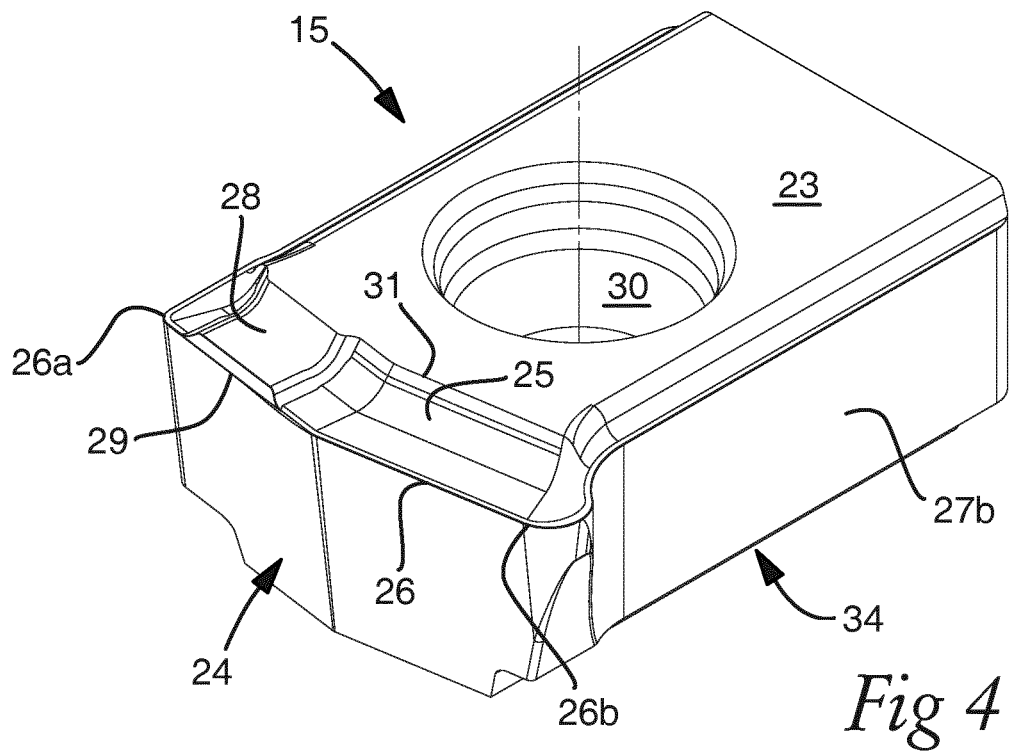
FIG. 4 is a perspective view of a peripheral cutting insert of the drill tool of FIG. 3.
Figure 5:
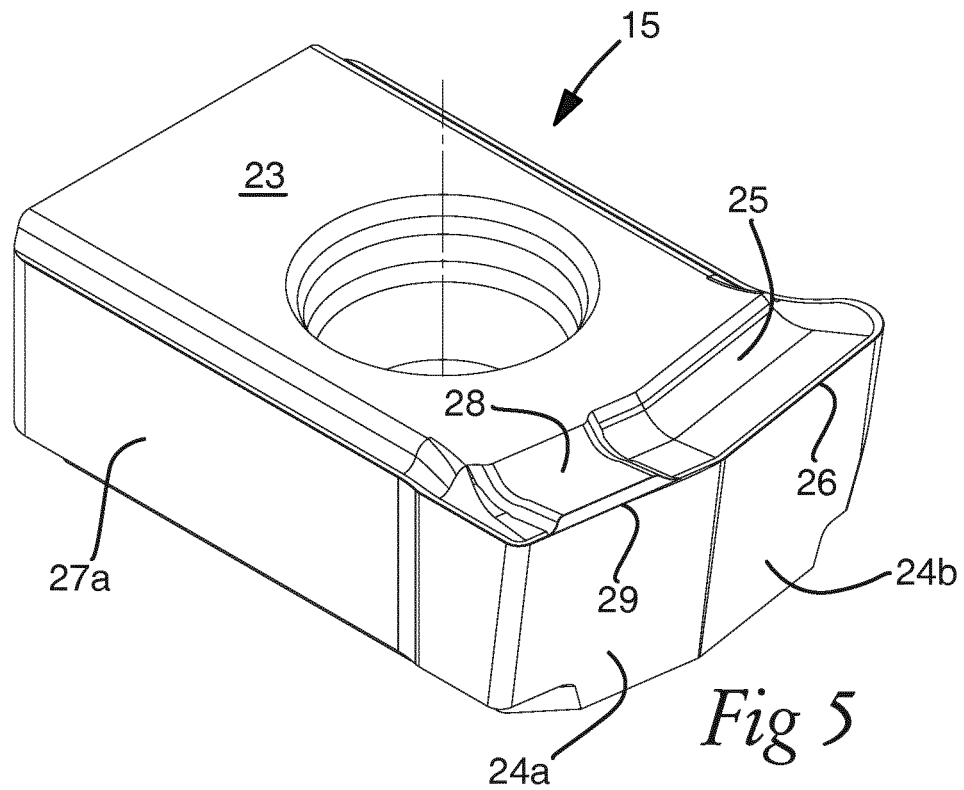
FIG. 5 is a further perspective view of the peripheral cutting insert of FIG. 4.
Figure 8:
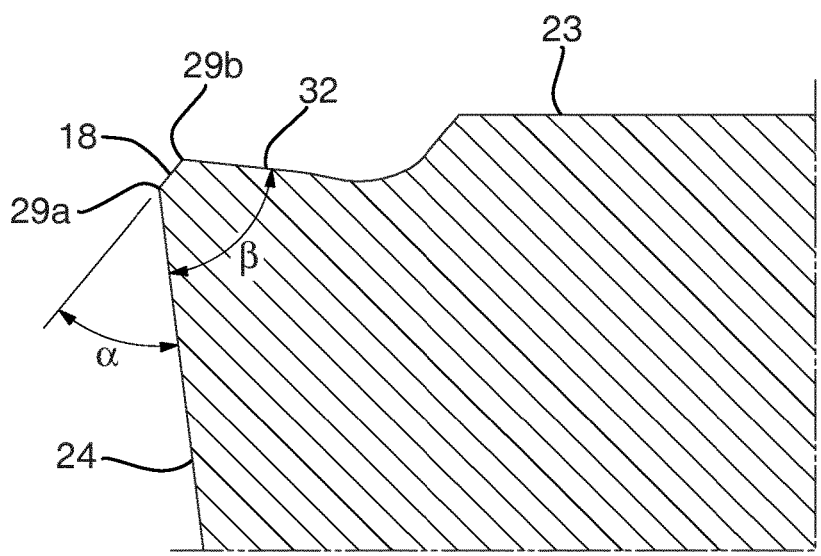
FIG. 8 is a cross sectional view through A-A of the peripheral cutting insert of FIG. 6.

Referring to FIGS. 4 and 5, peripheral insert 15 comprises a generally rectangular cuboidal shape profile having a generally rectangular front support face 23 (and a corresponding rearward support face 34). A first lateral side face 27a represents a radially inner region of insert 15 (when mounted at drill body 10) with face 27a positioned closest to axis 14. Insert 15 is further defined by a radially outer second lateral face 27b located at the radial perimeter of shaft 11 so as to be radially outward facing. The cutting edge 26 extends widthwise across insert 15 between lateral side faces 27a and 27b with cutting edge 26 aligned generally radially at drill body 10 as illustrated in FIGS. 2 to 3. Cutting edge 26 is defined at the intersection of a rake face 25 and a clearance face 24. Rake face 25 represents a recessed extension of support surface 23 and comprises at least a partially curved concave shape profile in a cross sectional plane A-A through insert 15 of FIG. 6, as illustrated further with reference to FIG. 8. Clearance face 24 is declined from a plane perpendicular to axis 14 such that when the insert 15 is mounted at the drill body 10, cutting edge 26 represents an axially leading portion of insert 15 so as to cut into the workpiece material when drill body 10 is rotated in direction R. According to the specific implementation, clearance face 24 may be considered to be divided into two regions in the widthwise direction across insert 15 (corresponding to the radial direction of the elongate drill body 10). In particular, clearance face 24 comprises a radially inner region 24a and a radially outer region 24b dimensioned to represent approximate radial inner and outer halves of insert 15 in the widthwise direction (corresponding to the lengthwise direction of cutting edge 26 between a radially inner end 26a and a radially outer end 26b). Clearance face first region 24a is aligned transverse to second region 24b such that the cutting edge 26 is angled along its length at an angle in an approximate range 158 to 162°. Referring to FIG. 8 and at the cross section A-A through insert 15, an angle β between clearance face 24 and an axially forward region of rake face 25 is in a range 70 to 80°. Such that the clearance face 24 extends at an acute angle relative to support surface 23. Such an arrangement provides that the leading cutting edge 26 is at least partially defined by an undercut at the axially forward leading region of insert 15.

According to the specific implementation, insert 15 comprises a chip disruptor (alternatively termed a chip breaker) provided at rake face 25 in the form of a raised projection. A chamfer indicated generally by reference 29 is provided at a leading region of disruptor 28 (in a lengthwise direction of insert 15) with the chamfer 29 positioned at the intersection of the rake face 25 and clearance face 24. That is, chamfer 29 comprises a first edge 29a positionally corresponding to the primary cutting edge 26 and a second edge 29b (aligned parallel to first edge 29a) that is raised, having a height difference relative to the first edge 29a (and main cutting edge 26) as illustrated referring to FIG. 7 and imaginary planes H1 and H2. Accordingly, chamfer 29 comprises an intersection surface 18 defined between edges 29a, 29b that is aligned transverse to clearance face 24 and at least an axially leading part of rake face 25. Referring to FIG. 8, an angle α between clearance face 24 and intersection surface 18 of chamfer 29 is in a range 25 to 65° or more preferably 40 to 50°. Chamfer 29 and in particular intersection surface 18 transitions into a disruptor main face 32 that is aligned approximately with plane P2 of FIG. 2. A shape profile of disruptor main face 32, in a plane A-A of FIG. 6, corresponds with a general shape profile of rake face 25 at one or either side of disruptor 28. Referring to FIG. 8, an angle β between clearance face 24 and an axially forward or leading portion of disruptor main face 32 is in a range 70 to 85°.

According to the specific implementation, disruptor 28 extends completely (in a widthwise direction across rake face 25) between cutting edge 26 (disruptor leading edge 29a) and a rearward end 31 of rake face 25 positioned at the junction with support surface 23. According to further implementations, disruptor 28 may be provided only at the forward region of rake face 25 in a direction towards cutting edge 26. Advantageously, the embodiment of FIGS. 1 to 8 provides a structurally strong configuration to withstand high temperatures and stress during cutting to minimise the likelihood of stress concentrations at the insert 15. Disruptor 28 in addition to the inclined chamfer 29 (approximately positioned at cutting edge 26) also comprises a corresponding pair of bevelled side faces 33a, 33b that provide a transition in the height direction between H1 and H2 between rake face 25 and disruptor main face 32. An angle of side faces 33a, 33b relative to imaginary plane H1 is approximately equal to the angle α between intersection surface 18 and clearance face 24. Such an arrangement provides a smooth transition from the rake face 25 over and across the chip disruptor 28 to minimise stress concentrations and to further facilitate chip breakage.

Figure 6:
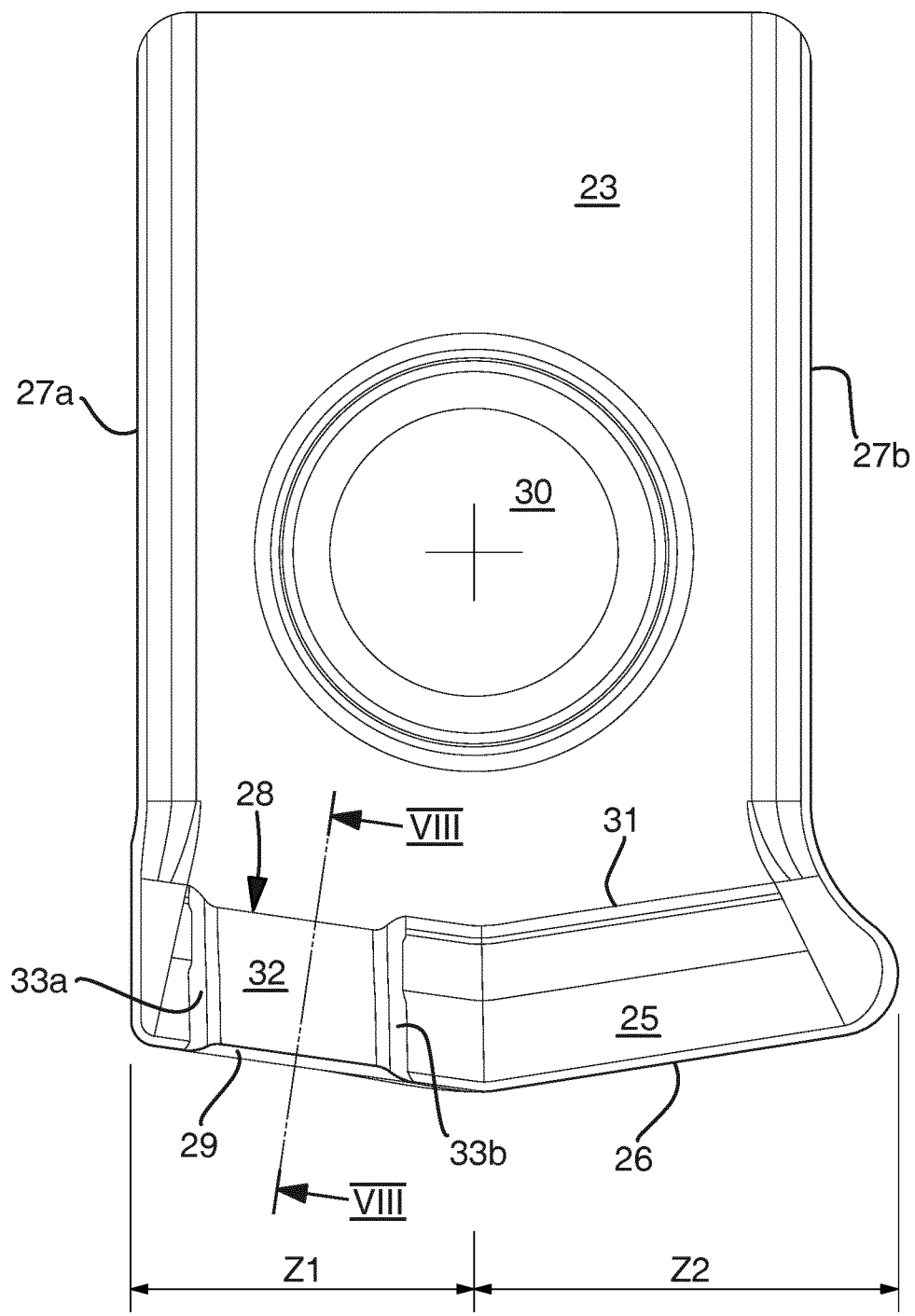
FIG. 6 is a plan view of the peripheral cutting insert of FIG. 5.
Figure 7:
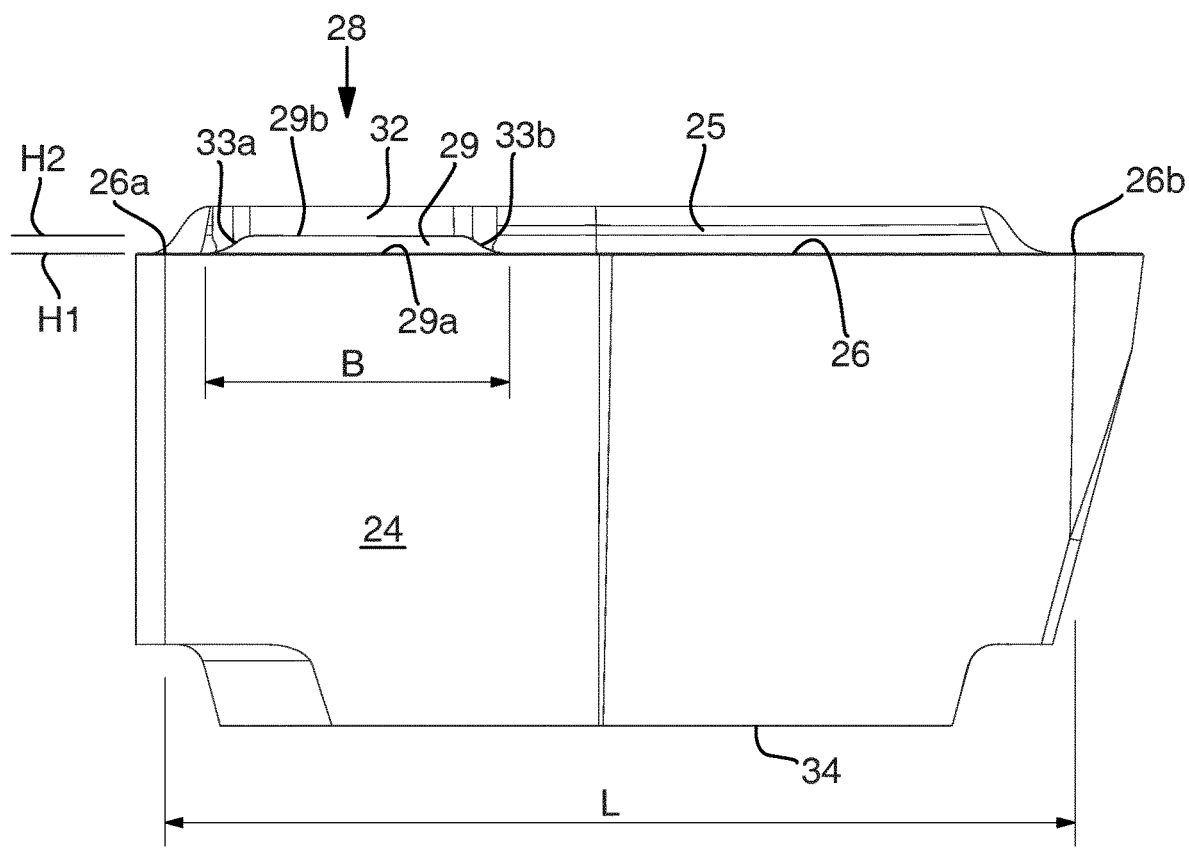
FIG. 7 is an end view of the peripheral cutting insert of FIG. 6 viewed from the cutting region.

As will be noted from FIGS. 6 and 7, chip disruptor 28 formed as a raised ridge or shelf at the rake face 25 is positioned within a radially inner half of insert 15 in the radial direction of the drill body 10 relative to axis 14. That is, the disruptor 28 is positioned exclusively within a radially inner zone Z1 relative to a radially outer zone Z2 where Z1 and Z2 are approximately equal in a radial direction of drill body 10, corresponding to the widthwise direction across insert 15. In particular, a length B of disruptor 28 is in a range 20 to 45% and preferably 28 to 38% of a total axial length L of the cutting edge 26 (including disruptor cutting edge 29a) between cutting edge radially inner and outer ends 26a and 26b.

Referring again to FIGS. 1 to 3, the central insert 16 is mounted axially forward of peripheral insert 15 such that the workpiece (not shown) is first entered by the central insert to create an initial annular groove around axis 14. By continued rotation and axial advancement, the leading cutting edge 26 (and chamfer 29) of insert 15 engage into the workpiece so as to form an effective extension of the cutting edge 21 of the central insert 16. In particular, in the rotational direction R, the central and peripheral inserts 16, 15 are positioned radially such that their respective cutting edges 21, 26 and 29*a* overlap within an intersection zone corresponding to inner zone Z1 of peripheral insert 15. It is within this zone Z1 that cutting of the workpiece occurs cooperatively by the radially overlapping cutting edges of the two inserts 16, 15. According to the specific implementation, chip disruptor 28 and chamfer 29 are positioned exclusively within the intersection zone Z1 of the central and peripheral inserts 16, 15 with respect to the overlapping rotational paths of the inserts 16, 15 about axis 14. A portion of the chip resulting from cutting within the intersection zone Z1 has been found to be more susceptible to cracking and it is at this region where chamfer 29 is positioned so as to increase the cutting resistance and accordingly enhance the brittleness of the chip to hence facilitate chip breaking. As will be appreciated, both zones Z1 and Z2 are generally annular ring-shaped sweep areas extending around axis 14 with the radial position of zone Z2 effectively defining the diameter of the borehole.

Importantly, the cutting edge 26 at both the radially inner and radially outer sides of disruptor 28 is not chamfered and are formed as relatively sharp intersections between clearance face 24 and rake face 25. That is, the chamfer 29 extends over a minor portion in the widthwise direction of insert 15 relative to a total length L of cutting edge 26, where the total length L of the cutting edge 26 includes the chamfer edge 29*a* and the cutting edge 26 at one or both sides of the chip disruptor 28. Such an arrangement is advantageous to maximise the stability of drill body 10 during rotation whilst facilitating chip breakage. In particular, chamfer 29 is configured to increase the cutting resistance of the insert 12 as the drill body 10 rotates in direction R. Accordingly, the forming chip is heated due to the increased resistance which in turn increases its brittleness rendering the chip more susceptible to cracking. The raised profile of the disruptor 28, extending from cutting edge 26 (disruptor cutting edge 29*a*) accordingly provides an obstruction to the chip as it forms at rake face 25. The combination of enhanced brittleness and the raised profile of disruptor 28 act to fracture and brake the chip continually as the tool body is rotated in direction R. Accordingly, the subject invention is configured to maintain to a minimum the length of the as-formed chip and to avoid specifically the creation of long helical chips or tightly curled chip balls that would otherwise reduce drilling efficiency. The present insert configuration therefore facilitates rearward evacuation of the chips within the as-formed bore via the chip flutes 17.

Figure 9:
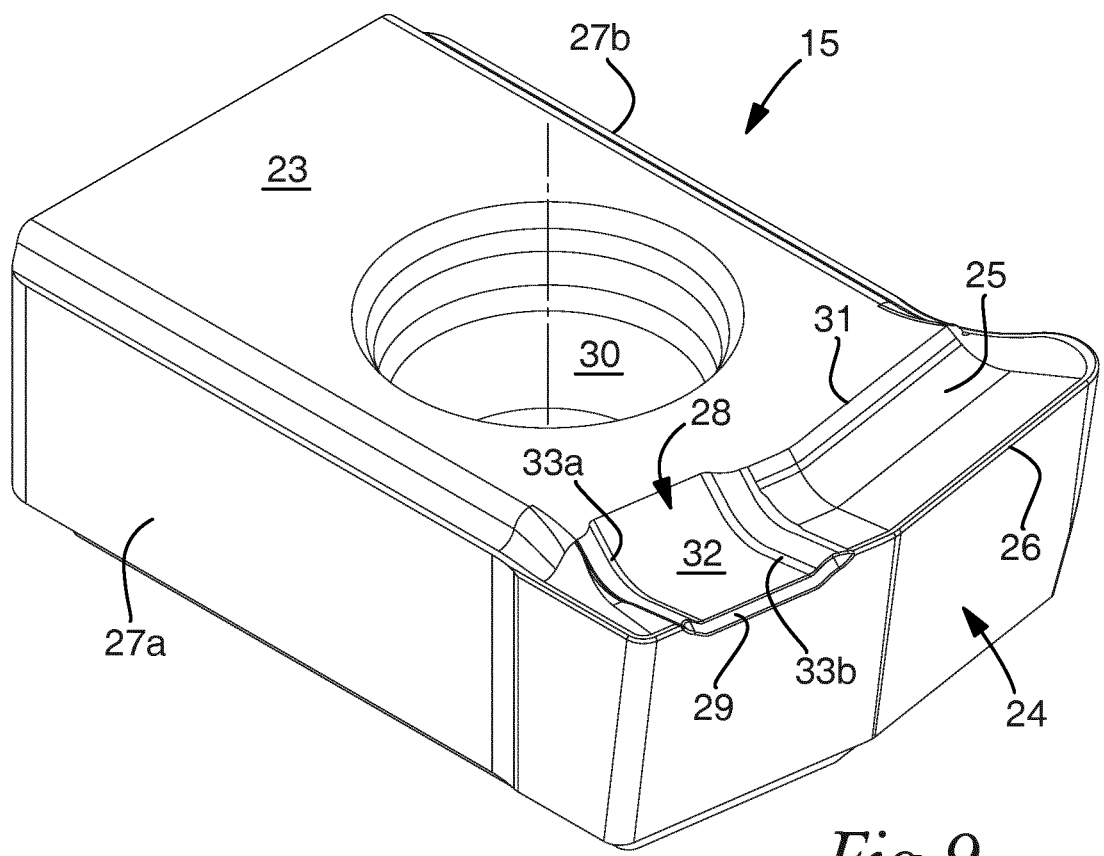
FIG. 9 is a perspective view of a peripheral cutting insert of the drill tool of FIG. 3 according to a further specific implementation.
Figure 10:
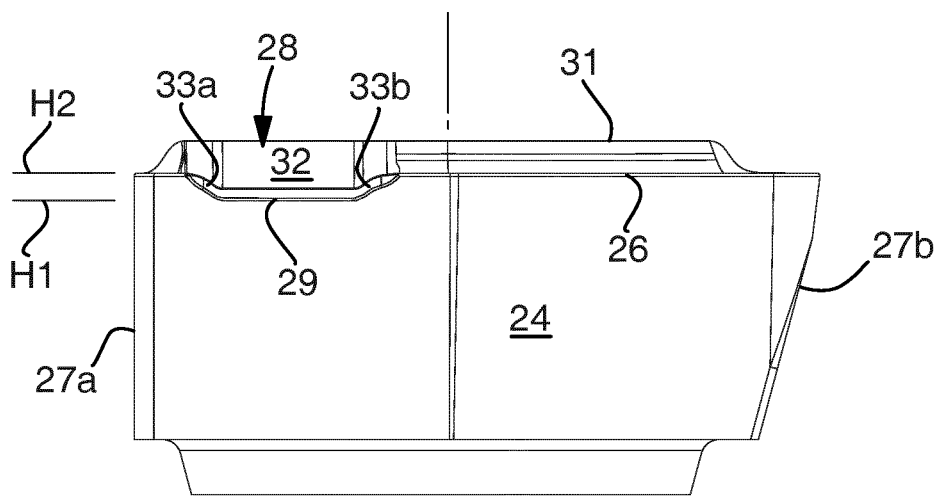
FIG. 10 is an end view of the peripheral cutting insert of FIG. 9 according to the further embodiment.

A further embodiment of the present invention is described with reference to FIGS. 9 and 10 in which the disruptor 28 is formed as a recess or groove at rake face 25. That is, a main surface 32 of the disruptor 28 is positioned at a lower height H1 relative to a height H2 of the rake face 25 immediately behind cutting edge 26. Similarly, disruptor side faces 33*a*, 33*b* extend widthwise across the rake face 25 so as to define the groove-shaped disruptor 28, with the lateral side faces 33*a*, 33*b* aligned at a corresponding inclination consistent with chamfer 29 relative to a plane perpendicular to tool axis 14. The shape profile and orientation of chamfer 29 according to the further embodiment of FIGS. 9 to 10 corresponds to the first embodiment of FIGS. 4 to 8 in which the inclined intersection surface 18 is orientated at an angle α relative to clearance face 24. The same mechanism of chip breakage applies to the second embodiment in which the chamfer provides an increased resistance to cutting to change the physical and mechanical properties of the as-formed chip with the chip being fractured and broken by the height difference between H1 and H2 provided by the disruptor main face 32 and rake face 25. Again, the dimensions and size of the disruptor 28 of the second embodiment are approximately equal to the primary embodiment, having a length B in a radial direction of drill body 10 and a width (in the lengthwise direction of the insert 15) extending completely across the full width of the rake face 25 between cutting edge 26 and rake face rearward end 31.

Figure 11:
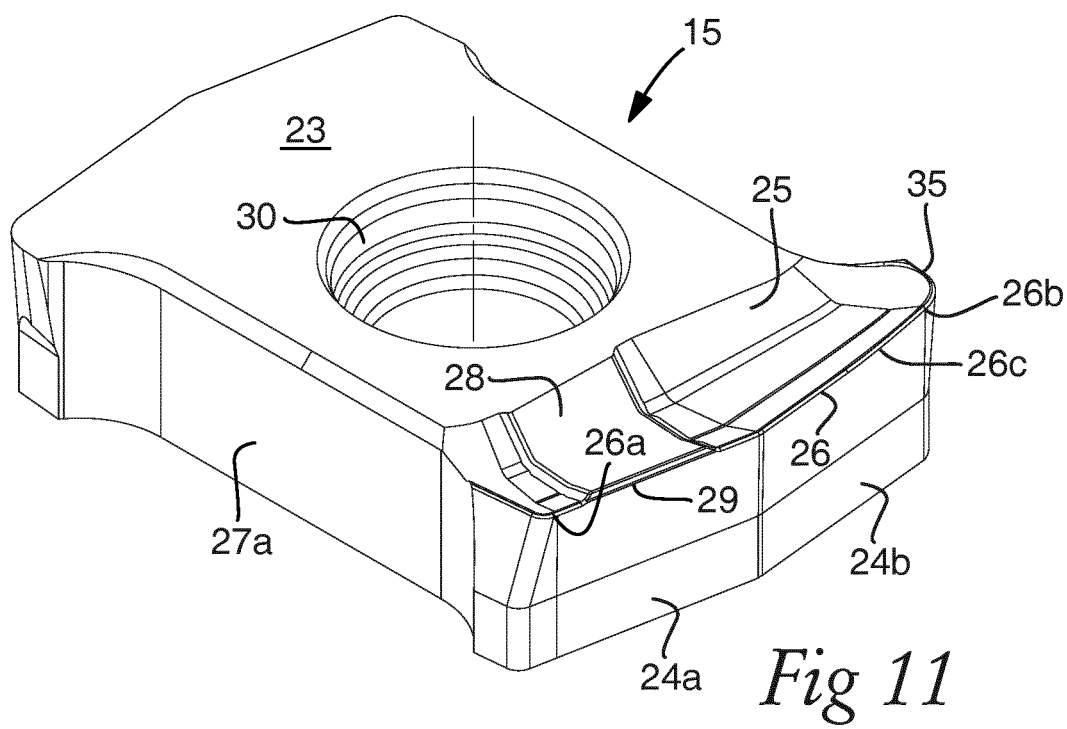
FIG. 11 is a perspective view of a peripheral cutting insert according to a further embodiment having a cutting edge profile configured to encourage chip curl.
Figure 12:
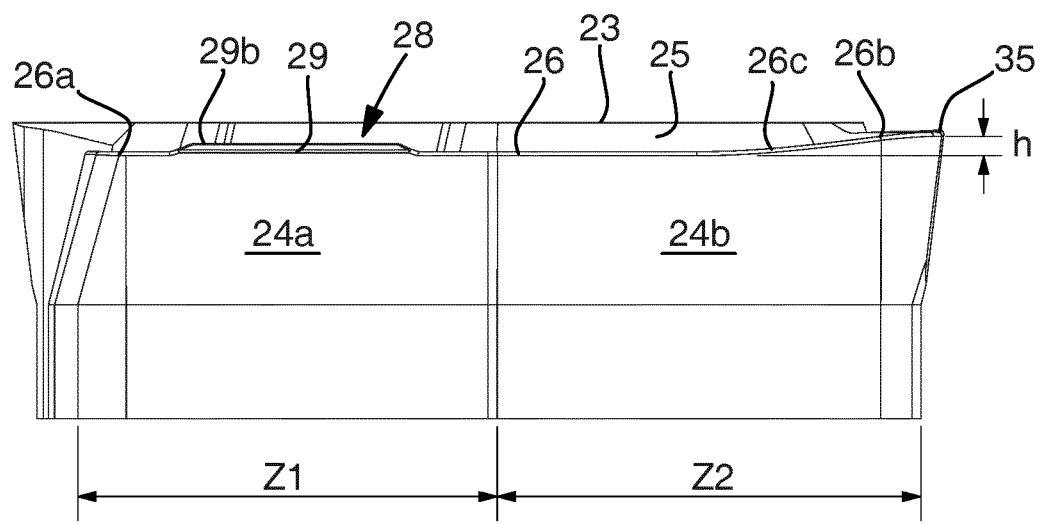
FIG. 12 is an end view of the peripheral cutting insert of FIG. 11 viewed from the cutting edge region.

FIGS. 11 and 12 illustrate a further embodiment of the subject invention having a cutting edge 26 adapted to encourage and facilitate chip curl. The majority of the features and function of the peripheral insert embodiments of FIGS. 2 to 10 are common to the further embodiment of FIGS. 11 to 12. According to the further embodiment, with insert 15 mounted at the drill body 10, a radially outer portion 26*c* of cutting edge 26 is curved, and in particular concave, so as to project forward of a remainder (and a majority) of the length of the cutting edge 26 at the central and radially inner regions of the insert 15 relative to the rotational direction R. When viewed end-on from clearance face 24, the cutting edge 26 at the radially outer portion 26*c* may be considered to be raised to deflect upwardly to increase the height (and thickness) of the insert 15 within zone Z2. In particular, the radially outer end 26*b* of the cutting edge 26 is raised at a height h above a mid-length region of the cutting edge 26 and the region within the radially inner zone Z1. According to the specific implementation, the cutting edge 26 is curved in the height or thickness direction of the insert 15 (when viewed end-on from the clearance face 24) to provide a large radius curved transition portion 26*c* within zone Z2, with the portion 26*c* extending between an approximate mid-length position to the radially outer end 26*b* of cutting edge 26 (where the outer end 26*b* is positioned immediately radially inside an outermost end 35 of insert 15) According to the specific embodiment, h is greater than a height by which the chamfer 29 extends above the main length of cutting edge 26 corresponding to chamfer second edge 29*b*. Additionally, h is less than a height by which the support face 23 is raised relative to the majority of the length of cutting edge 26 (when insert 15 is viewed from the cutting end region (and in particular clearance face 24) as illustrated in FIG. 12 (and FIG. 7).

Cutting edge region 26*c* according to the embodiment is curved i.e., concave in plane P2 (referring to FIG. 3). However, according to further embodiments the transition may be angled. The radially outer portion 26*c* of cutting edge 26 being curved or angled (so as to project forward of the remainder of the cutting edge 26 in the rotational direction R) facilitates the creation of tightly curled chips that accordingly occupy less volume within the as-formed bore relative to elongate chip strips or loosely spiraled chips. As will be appreciated, this is advantageous to facilitate chip ejection from the bore and accordingly increase cutting efficiency and extend insert and cutting tool lifetimes.

The invention claimed is:
1. A metal cutting drill insert for a drill tool comprising:
at least one cutting edge formed at an intersection of an adjoining rake face and a clearance face, the cutting edge having a length arranged to be aligned radially at the tool;
a chip disruptor formed as a raised projection or recess at the rake face and extending from the cutting edge, wherein a length of the chip disruptor in a lengthwise direction along the rake face is less than a remaining length portion of the cutting edge at one or both sides of the chip disruptor between lateral sides of the insert; and a chamfer at the intersection of the rake face and the clearance face and positioned at the chip disruptor, the chamfer being defined relative to a profile of the cutting edge at one or either side of the chip disruptor.

2. The insert as claimed in claim 1, being configured to work cooperatively with a second insert, the inserts being mountable at the tool at different radial positions such that during a rotation thereof, the inserts overlap radially to define an annular intersection zone, wherein the chip disruptor is positioned relative to the cutting edge within the intersection zone.

3. The insert as claimed in claim 1, wherein the chamfer at the chip disruptor defines an in intersection surface aligned transverse to the adjoining rake face and the clearance face, the cutting edge at one or either side of the chip disruptor being devoid of an intersection surface having an alignment and/or a width extending between the rake face and the clearance face that corresponds to that of the intersection surface at the chip disruptor.

4. The insert as claimed in claim 1, wherein a length of the chip disruptor is 5 to 60% of a total length of the cutting edge, where the total length includes the chamfer and the cutting edge at one or both sides of the chip disruptor.

5. The insert as claimed in claim 1, comprising a single chip disruptor at the rake face.

6. The insert as claimed in claim 1, wherein the chamfer at the chip disruptor includes an intersection surface and in a plane perpendicular to a length of the cutting edge the intersection surface is aligned in a range 20 to 70°, 25 to 65°, 30 to 60°, 35 to 55° or 40 to 50° relative to the clearance face.

7. The insert as claimed in claim 1, wherein the chip disruptor extends partially or completely in widthwise direction across the rake face perpendicular to a length of the cutting edge.

8. The insert as claimed in claim 1, wherein the insert is a peripheral insert arranged to work cooperatively with a central insert of the drill tool, the peripheral and central inserts being defined positionally relative to one another in a radial direction of the drill tool.

9. The insert as claimed in claim 1, comprising an overall generally rectangular cuboidal shape in which the cutting edge extends widthwise across the insert at one edge or two opposite edges of the insert.

10. The insert as claimed in claim 1, wherein the chip disruptor is positioned at the insert in a lengthwise direction of the cutting edge closer to a first lateral side of the insert relative to a second lateral side of the insert.

11. The insert as claimed in claim 10, wherein the chip disruptor is positioned in a lengthwise direction of the cutting edge exclusively in a first half of the insert closer to the first lateral side.

12. The insert as claimed in claim 1, wherein in a lengthwise direction of the cutting edge, a portion of the cutting edge is curved or angled such that a second end of the cutting edge closest to a second lateral side of the insert is raised relative to a first end of the cutting edge closest to a first lateral side of the insert.

13. The insert as claimed in claim 12, wherein a portion of the cutting edge closest to the second lateral side is concave to be curved upwardly towards the second end of the cutting edge when the insert is viewed end-on from the clearance face.

14. A metal cutting drill tool comprising:
an elongate drill body having an axially forward boring shaft and an axially rearward mount shank; and
a drill insert as claimed in claim 1, mountable at an axially forward end of the shaft.

15. The tool as claimed in claim 14, wherein the insert is mounted at a radially peripheral region of the drill tool to form a peripheral insert.

16. The tool as claimed in claim 15, further comprising a second cutting insert mounted at or towards a radial central region of the drill tool to form a central insert relative to the peripheral insert.

17. The tool as claimed in claim 16, comprising a single peripheral and a single central insert mounted at the axially forward end of the shaft.

18. The tool as claimed in claim 16, wherein the peripheral and central inserts are mounted at the drill tool such that during a rotation thereof, the inserts overlap radially to define an annular intersection zone, wherein the chip disruptor is positioned relative to the cutting edge within the intersection zone.

19. The tool as claimed in claim 18, wherein in a radial direction, a majority of the chip disruptor is positioned within the intersection zone.

20. The tool as claimed in claim 14, wherein the boring shaft includes chip flutes extending axially rearward from the axially forward end towards the mount shank.

* * * * *